(12) United States Patent
Muto et al.

(10) Patent No.: US 7,655,336 B2
(45) Date of Patent: Feb. 2, 2010

(54) FUEL-CELL SYSTEM

(75) Inventors: Go Muto, Wako (JP); Haruo Nakamura, Wako (JP); Hiroshi Umeno, Wako (JP); Shigeru Toda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 944 days.

(21) Appl. No.: 10/849,371

(22) Filed: May 20, 2004

(65) Prior Publication Data

US 2004/0241512 A1 Dec. 2, 2004

(30) Foreign Application Priority Data

May 29, 2003 (JP) ............................. 2003-151990
May 29, 2003 (JP) ............................. 2003-151991

(51) Int. Cl.
*H01M 2/00* (2006.01)
*H01M 8/04* (2006.01)

(52) U.S. Cl. ......................................... 429/34; 429/23

(58) Field of Classification Search .................. 429/23, 429/34
See application file for complete search history.

(56) References Cited

U.S. PATENT DOCUMENTS

| | | | | |
|---|---|---|---|---|
| 2001/0055707 A1* | 12/2001 | Roberts et al. | ................ | 429/30 |
| 2002/0192520 A1* | 12/2002 | Nonobe | ....................... | 429/23 |
| 2003/0022041 A1* | 1/2003 | Barton et al. | ................ | 429/23 |
| 2003/0148167 A1* | 8/2003 | Sugawara et al. | ............ | 429/34 |
| 2004/0101734 A1* | 5/2004 | Morishima et al. | ........... | 429/34 |

FOREIGN PATENT DOCUMENTS

| | | |
|---|---|---|
| JP | 48-25577 | 7/1973 |
| JP | 02-024971 A | 1/1990 |
| JP | 02-086070 | 3/1990 |
| JP | 05-013094 A | 1/1993 |
| JP | 07-505011 | 9/1993 |
| JP | 09-293522 A | 11/1997 |
| JP | 2000-215905 | 8/2000 |
| JP | 2000-243417 | 9/2000 |

(Continued)

*Primary Examiner*—Patrick Ryan
*Assistant Examiner*—Muhammad Siddiquee
(74) *Attorney, Agent, or Firm*—Westerman, Hattori, Daniels & Adrian, LLP

(57) ABSTRACT

A fuel-cell system with a fuel battery comprising more than one fuel cell having a purge gas passage connecting the fuel battery to a purge gas cylinder, a discharge passage connecting the fuel battery to the exterior, solenoid valves each installed in the passages, and an electronic control unit that opens the solenoid valves to open the passages to supply the purge gas to the fuel battery such that residue in the fuel battery is purged to the exterior by the purge gas. The control unit opens the valves at a time interval determined from an output of a current sensor to conduct purge at optimum timing for the battery operating state so as to prevent accumulation of residue in the fuel battery, while preventing repetition of unnecessary purges. Alternatively, manual valves are provided to be manually opened by an operator to open a fuel gas supply passage to supply the fuel gas such that residue is purged by the fuel gas through the discharge passage, thereby enabling fuel supply and purge of residue at starting of power generation, without using an external power source.

6 Claims, 9 Drawing Sheets

FOREIGN PATENT DOCUMENTS

| | | |
|---|---|---|
| JP | 2002-243417 | 9/2000 |
| JP | 2001-216988 | 8/2001 |
| JP | 2001-229938 | 8/2001 |
| JP | 2002-008698 A | 1/2002 |
| JP | 2002-289237 | 10/2002 |
| JP | 2003-115314 | 4/2003 |
| JP | 2004-071307 | 3/2004 |
| JP | 2004-247052 A | 9/2004 |
| JP | 2004-311149 | 11/2004 |
| JP | 2005-507542 | 3/2005 |
| JP | 2007-201504 A | 1/2007 |
| WO | WO 2004/102715 A1 | 11/2004 |

\* cited by examiner

FIG. 3

| OUTPUT CURRENT I (A/cm²) | PURGE INTERVAL t (min) | THRESHOLD VALUE #V (V) |
|---|---|---|
| 0~0.1 | 20 | 0.6 |
| 0.1~0.15 | 10 | 0.6 |
| 0.15~0.2 | 5 | 0.55 |
| 0.2~0.25 | 3 | 0.5 |
| 0.25~0.3 | 1 | 0.45 |

FUEL-CELL SYSTEM

BACKGROUND OF THE INVENTION

1. Field of the Invention

This invention relates to a fuel-cell system having a fuel battery comprising more than one fuel cell that changes chemical energy of a fuel and oxidant to electric energy.

2. Description of the Related Art

Retention and/or accumulation of nonreactant gas and/or generated water in a fuel battery lowers the ability to generate power. The practice is therefore to purge the fuel battery of nonreactant gas and/or generated water at regular time intervals, while also monitoring the generated voltage of the fuel battery and carrying out a supplementary purge whenever the generated voltage falls below a predetermined level, as disclosed, for example, in Japanese Laid-open Patent Application No. 2000-243417.

The amount of nonreactant gas and generated water present in a fuel battery varies with the operating state of (load on) the fuel battery. When purges are programmed to be conducted at predetermined time intervals (time periods between consecutive purges) as in the prior art, however, purge is not always performed at the optimum time point. This may result in accumulation of retained nonreactant gas and/or generated water because purge is not carried out when necessary or in repeated unnecessary purges.

On the other hand, the method of conducting purges when the output voltage falls below a predetermined level is also liable to result in repeated unnecessary purges when the fuel battery is connected to a high-load external piece of equipment and the output voltage is stable at a low level.

Aside from the above, when the operation (power generation) of a fuel battery is terminated or stopped, nitrogen and other nonreactant gases may be retained in the fuel battery owing to air flowing in from the air electrode through the electrolytic membrane. In addition, generated water produced in the course of operation sometimes collects to cause water clogging of the passages and diffusion membranes. When such a situation arises, fuel (hydrogen gas) supplied to start power generation of the fuel battery is blocked by the retained gas and/or water and does not reach the fuel cell electrodes, occasionally making it impossible to obtain a desired electromotive force.

It is therefore a conventional practice to discharge (purge) residue from a fuel battery when the operation is to be started, as disclosed, for example, in Japanese Laid-open Patent Application No. 2001-216988.

Most purge systems for discharging residue are composed of a passage (piping/tubing) communicating with the exterior of the fuel battery and a solenoid valve for opening and closing the passage. Moreover, the fuel supply system for supplying fuel (hydrogen gas) to the fuel battery is generally composed of a passage that connects the fuel battery to a gas cylinder charged with fuel gas under high pressure and a solenoid valve for opening and closing the passage. Since solenoid valves are used in the fuel supply and purge systems, an external power source such as a battery is required when the power generation is started. When the fuel battery is used as a portable power generating unit, therefore, portability is degraded by the larger volume and weight of the unit.

SUMMARY OF THE INVENTION

A first object of this invention is therefore to provide a fuel-cell system having a fuel battery comprising more than one fuel cell that changes chemical energy of a fuel and oxidant to electric energy, wherein purge is conducted at optimum timing for the operating state of (load on) of the fuel battery so as to prevent accumulation of nonreactant gas and/generated water in the fuel battery and that also prevents repetition of unnecessary purges.

A second object of this invention is therefore to provide a fuel-cell system having a fuel battery comprising more than one fuel cell that changes chemical energy of a fuel and oxidant to electric energy, which enables fuel supply and discharge or purge of residue at starting of the power generation of the fuel battery, without using an external power source, thereby ensuring to obtain a desired electromotive force.

This invention provides, in a first aspect, a fuel-cell system having a fuel battery comprising more than one fuel cell that changes chemical energy of a fuel and oxidant to electric energy, comprising: a first passage connecting the fuel battery to a purge gas supply source; a second passage connecting the fuel battery to exterior of the fuel battery; a first solenoid valve installed in the first passage; a second solenoid valve installed in the second passage; a current sensor producing an output indicative of current generated by the fuel battery; and an electronic control unit that opens the first and second solenoid valves to open the first and second passages to supply the purge gas to the fuel battery through the first passage such that residue in the fuel battery is purged to the exterior through the second passage by the purge gas, at a time interval determined from the output of the current sensor.

This invention provides, in a second aspect, a fuel-cell system having a fuel battery comprising more than one fuel cell that changes chemical energy of a fuel and oxidant to electric energy, comprising: a first passage connecting the fuel battery to a fuel gas supply source; a second passage connecting the fuel battery to exterior of the fuel battery; a first manual valve installed in the first passage to be manually opened; and a second manual valve installed in the second passage to be manually opened, the first and second manual valves being arranged to be manually opened by an operator to open the first and second passages to supply the fuel gas to the fuel battery through the first passage such that residue in the fuel battery is purged to the exterior through the second passage by the fuel gas.

BRIEF DESCRIPTION OF THE DRAWINGS

The above and other objects and advantages of the invention will be more apparent from the following description and drawings, in which:

FIG. 3 is a table showing the relationships between current generated by a fuel battery illustrated in FIG. 1 and purge interval, etc.;

DETAILED DESCRIPTION OF THE PREFERRED EMBODIMENTS

A fuel-cell system according to embodiments of the invention will now be explained with reference to the attached drawings.

Figure 1:
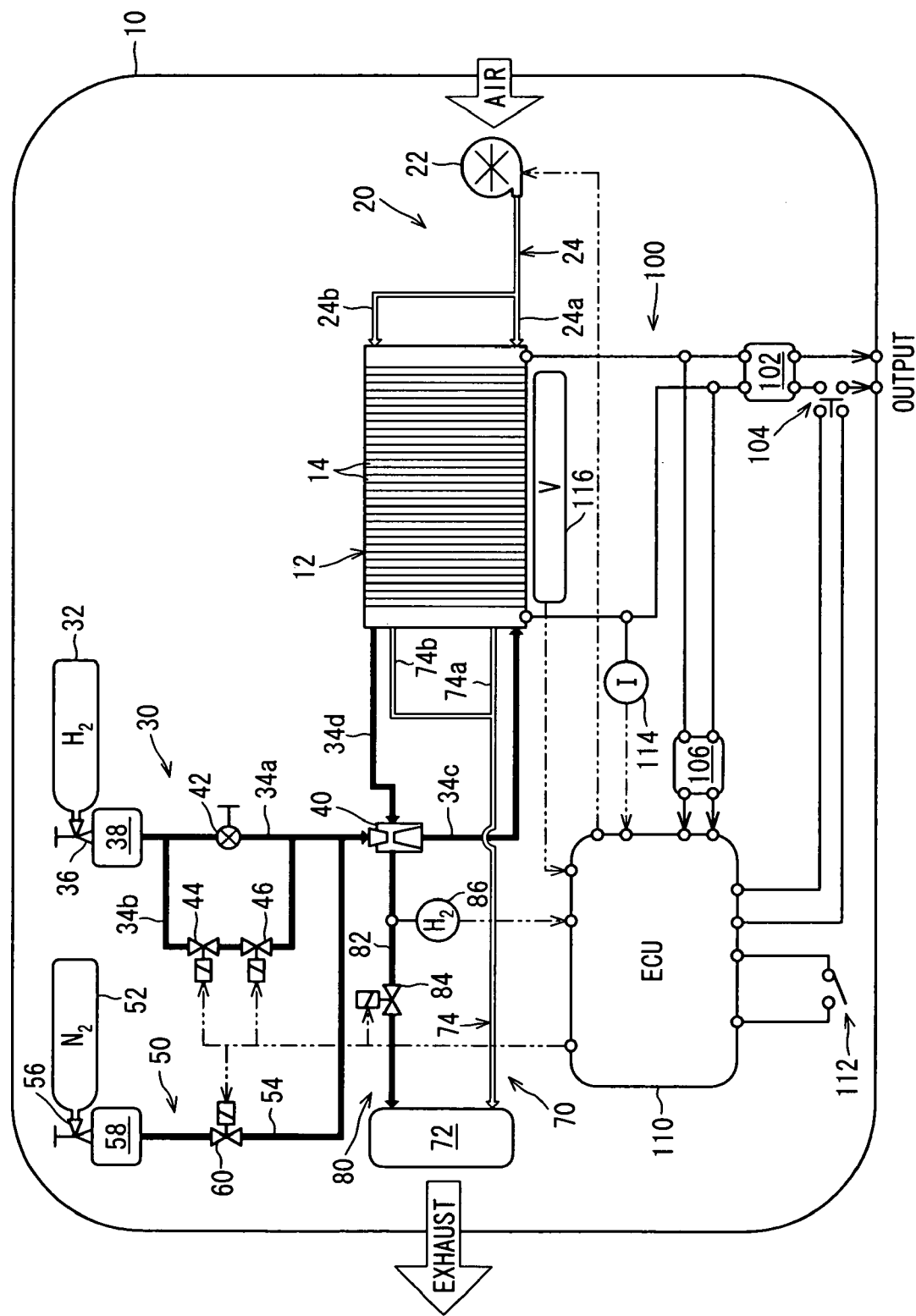
FIG. 1 is a schematic diagram showing the configuration of a fuel-cell system according to a first embodiment of the invention.

FIG. 1 is a schematic diagram showing the configuration of a fuel-cell system according to a first embodiment of the invention.

Reference numeral 10 in FIG. 1 designates a fuel-cell system equipped according to the first embodiment. The fuel-cell system 10 is configured as a package of portable size including a fuel battery 12, piping/tubing and other components required for power generation.

The fuel battery 12 is made up of multiple, typically 70, individual fuel cells (electrochemical cells) 14 installed adjacent to one another and connected in series to have a rated power 1.05 kW. The individual cells 14 are polymer electrolyte fuel cells composed of an electrolytic membrane (solid polymer membrane) that is sandwiched by an air (oxygen) electrode (cathode) and a fuel electrode (anode), and separator plates located outside the respective electrodes. This is a conventional configuration and will not be explained in detail here. Thus, the fuel battery 12 comprises more than one fuel cell 14 that change chemical energy of a fuel and oxidant to electric energy.

The fuel battery 12 is connected to an air supply system 20 that supplies air to the fuel battery 12. The air supply system 20 is composed of an air blower 22 for blowing in air and an air supply line 24 that connects the air blower 22 with the fuel battery 12. Before reaching the fuel battery 12, the air supply line 24 branches into a cooling air supply passage 24a and a reactant air supply passage 24b.

The fuel battery 12 is further connected to a hydrogen gas supply system 30 that supplies hydrogen gas to the fuel battery 12. The hydrogen gas supply system 30 is composed of a hydrogen gas cylinder (bombe) 32 charged with hydrogen gas under high pressure, first to fourth passages 34a-34d that connect the hydrogen gas cylinder 32 with the fuel battery 12, and components installed in these passages that will be explained in the following.

The hydrogen gas cylinder 32 is connected to a regulator 38 through a manually operated cylinder valve 36, and the regulator 38 is connected to an ejector 40 through the first passage 34a. A main valve 42 (manually operated valve) installed in the first passage 34a is bypassed by the second passage 34b. A first solenoid valve 44 and a second solenoid valve 46 are installed in the second passage 34b. The ejector 40 is connected to the fuel electrodes of the fuel battery 12 through the third passage 34c and the fourth passage 34d. The third passage 34c is a supply side passage and the fourth passage 34d is a discharge side passage.

A nitrogen gas supply system 50 that supplies purge gas (gas for purging residue; the purge gas is an inert gas; in this embodiment nitrogen gas) to the fuel battery 12, is connected downstream of the main valve 42 in the first passage 34a. The nitrogen gas supply system 50 is composed of a nitrogen gas cylinder (bombe) 52 charged with nitrogen gas under high pressure, a fifth passage 54 that connects the nitrogen gas cylinder 52 to the first passage 34a, and components installed in these passages that will be explained in the following.

The nitrogen gas cylinder 52 is connected to a regulator 58 through a manually operated cylinder valve 56, and the regulator 58 is connected to the first passage 34a through the fifth passage 54. A third solenoid valve 60 is installed in the fifth passage 54.

The fuel battery 12 is also connected to an air discharge system 70. The air discharge system 70 is composed of an exhaust manifold 72 and an air discharge passage 74 that connects the fuel battery 12 to the exhaust manifold 72. The air discharge passage 74 branches into a cooling air discharge passage 74a and a reactant air discharge passage 74b that are connected to the fuel battery 12. Namely, these branch passages join into a single passage before being connected to the exhaust manifold 72.

The ejector 40 is connected to a purged gas discharge system 80. The purged gas discharge system 80 is composed of a purged gas discharge passage 82 that connects the ejector 40 and the exhaust manifold 72, and a fourth solenoid valve 84 installed in the purged gas discharge passage 82. A hydrogen sensor 86 is installed in the purged gas discharge passage 82 upstream of (on the fuel battery 12 side of) the fourth solenoid valve 84. The hydrogen sensor 86 produces a signal (ON/OFF signal) indicating whether or not hydrogen gas flows into the purged gas discharge passage 82. In this embodiment, an ON signal (output) is produced when hydrogen gas is detected; otherwise an OFF signal (output) is produced.

In FIG. 1, the passages for conducting nitrogen gas and hydrogen gas are represented by broad black lines and those for conducting air are represented by broad white lines.

An output circuit 100 connected to the output terminals of the fuel battery 12 includes a first DC-DC converter 102, a relay 104 and a second DC-DC converter 106. The output terminals of the fuel battery 12 are connected to an external piece of equipment (not shown) through the first DC-DC converter 102 and relay 104 and to an electronic control unit (ECU) 110 through the second DC-DC converter 106. The relay 104 and an operating switch 112 that can be switched ON/OFF from the exterior are connected to the ECU 110. The ECU comprises a microcomputer having a CPU, a ROM, a RAM and counters (neither shown)

The ECU 110 is also equipped with a current sensor 114 at a point between one output terminal of the operating switch 112 and the associated terminal of the first DC-DC converter 102. The current sensor 114 produces an output (signal) proportional to (indicative of) the generated current I of the fuel battery 12. A voltage sensor 116 connected to the individual cells 14 of the fuel battery 12 produces an output (signal) proportional to (indicative of) the generated voltage V of the fuel battery 12. The outputs of the hydrogen sensor 86, current sensor 114 and voltage sensor 116 are sent to the ECU 110.

The power generating operation of the fuel-cell system 10 in the foregoing configuration will now be explained.

The cylinder valve 36 is manually opened by an operator to supply high-pressure hydrogen gas from the hydrogen gas cylinder 32 to the regulator 38. While the main valve 42 is manually kept opened, the hydrogen gas reduced and regulated in pressure by the regulator 38 is supplied through the first passage 34a to the ejector 40 and from there through the third passage 34c to the fuel electrodes of the individual fuel cells 14 of the fuel battery 12. The first to fourth solenoid valves 44, 46, 60 and 84 shown in FIG. 1 are all closed when operation of the fuel battery 12 is terminated or stopped in order to prevent flow of hydrogen gas and nitrogen gas to the outside when the fuel battery 12 is not operating. In this sense, the first to fourth solenoid valves 44, 46, 60 and 84 can be called normally closed solenoid valves (i.e., valves that close when current is shut off (i.e., deenergized) and open when current is applied (i.e., energized)).

In each cell 14 of the fuel battery 12, hydrogen gas supplied to the fuel electrode electrochemically reacts with air (oxygen or oxidant) present at the air electrode to initiate power generation. The portion of the hydrogen gas supplied to the fuel electrode not consumed by the electrochemical reaction with air, called unreacted gas, is returned to the ejector 40 through the fourth passage 34d and again supplied to the fuel electrodes through the third passage 34c. Once the fuel battery 12 begins to generate power, the generated power is converted to an appropriate DC voltage by the second DC-DC converter 106 in the output circuit 100 and then supplied to the ECU 110 as operating power.

Upon being activated by this supply of power, the ECU 110 opens the first solenoid valve 44 and second solenoid valve 46 to supply hydrogen gas to the fuel electrodes through the second passage 34b and operates the air blower 22 to blow air into the air supply line 24. The air blown into the air supply line 24 by the air blower 22 is divided between the cooling air supply passage 24a and reactant air supply passage 24b at a predetermined ratio. The air passing into the cooling air supply passage 24a is supplied to the individual cells 14 as cooling air and the air passing into the reactant air supply passage 24b is supplied to the individual air electrodes as reactant air.

The cooling air used to cool the individual cells 14 and the reactant air having passed through the air electrodes are passed out of the fuel blower 12 through the cooling air discharge passage 74a and reactant air discharge passage 74b, respectively, and then discharged to the exterior through the exhaust manifold 72.

The opening of the first solenoid valve 44 and second solenoid valve 46 upon activation of the ECU 110 makes further manual operation of the main valve 42 unnecessary. The ECU 110 therefore operates a voice or display indicator (not shown) to inform the operator that power generation by the fuel battery 12 has started and the ECU 110 been activated, i.e., that the fuel-cell system 10 is ready to supply power to an external piece of equipment (load).

Upon learning that the power generation unit 10 is ready to supply power, the operator manually operates (turns on) the operating switch 112. In response thereto, the ECU 110 operates the relay 104 in the output circuit 100 to supply power to the external load, whereupon the power generated by the fuel battery 12 and converted to an appropriate DC voltage by the first DC-DC converter 102 is supplied to the external load through the relay 104.

The purge operation of the fuel-cell system according to this embodiment will now be explained.

Figure 2:
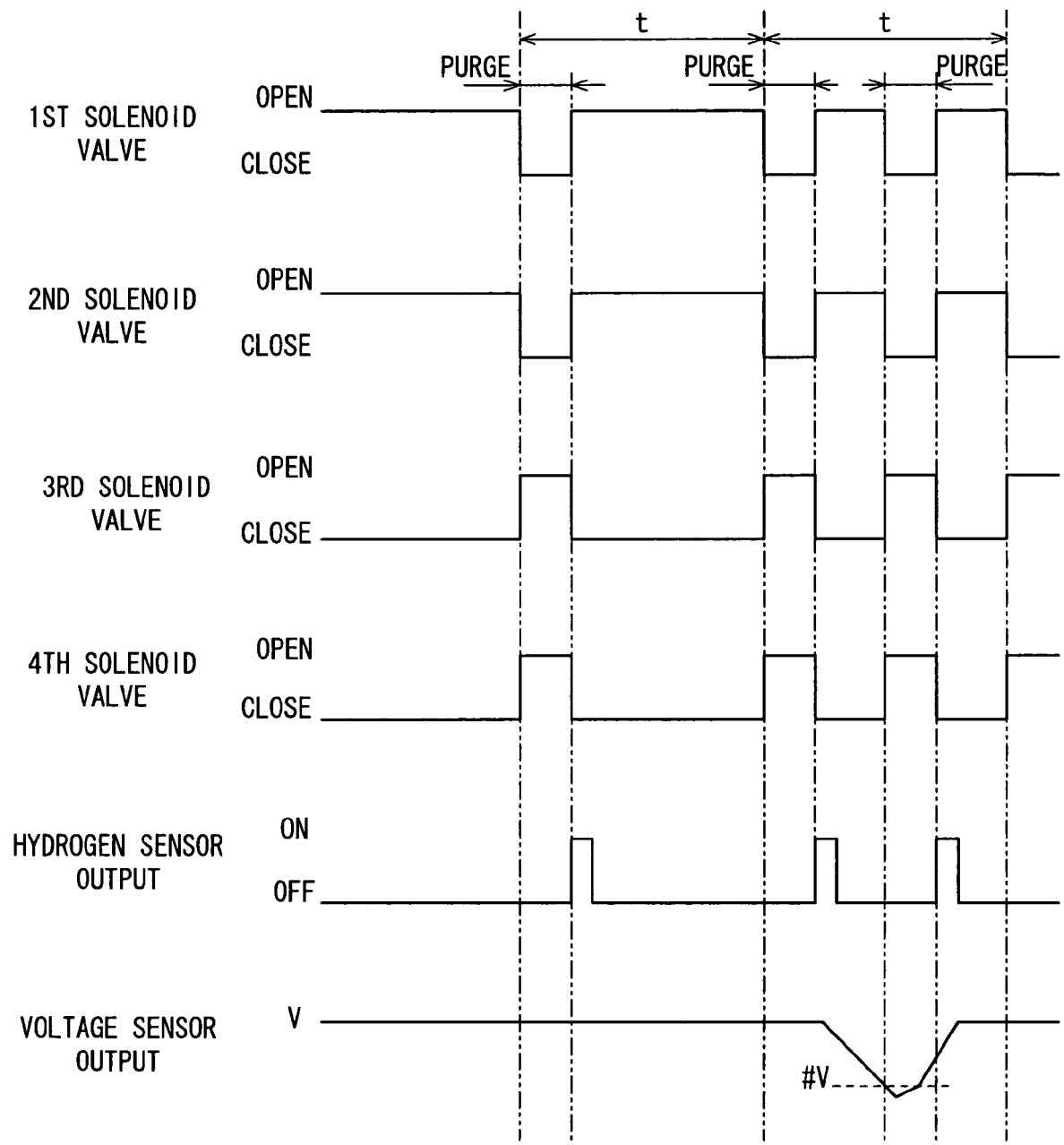
FIG. 2 is a time chart showing the opening and closing of solenoid valves illustrated in FIG. 1.

The ECU 110 regularly operates the solenoid valves to purge the fuel battery 12. Specifically, it conducts purges by closing the first solenoid valve 44 and second solenoid valve 46 in the second passage 34b to shut off the supply of hydrogen gas and opening the third solenoid valve 60 in the fifth passage 54 and the fourth solenoid valve 84 in the purged gas discharge passage 82. FIG. 2 is a time chart showing the opening and closing of these solenoid valves.

Owing to these operations, the high-pressure nitrogen gas in the cylinder 52 is supplied through the cylinder valve 56, to the regulator 58 which reduces and regulates its pressure, and is then supplied to the fuel cell electrodes of the fuel battery 12 through the fifth passage 54, ejector 40 and third passage 34c. The cylinder valve 56 is to be opened by the operator when the operation of the fuel battery 12 is started. The nitrogen gas supplied to each fuel electrode drives the nonreactant gas and generated water retained in the fuel electrode out of the fuel battery 12 to be discharged to the exterior through the fourth passage 34d, ejector 40, purged gas discharge passage 82 and exhaust manifold 72.

The amount of nonreactant gas and generated water occurring in the fuel battery 12 depends on the operating state of (load on) the fuel battery 12. Unless the purges are appropriately timed, therefore, there is a risk of nonreactant gas and/or generated water being accumulated or of repeated unnecessary purges being carried out. In this embodiment, therefore, the time period between the execution of the current purge and the execution of the next purge (designated by the symbol t in FIG. 2; hereinafter called the "purge interval") is determined based on the detection value of the current sensor 114.

Specifically, since it can be assumed that the amount of generated water and nonreactant gas that occurs will increase with increasing amount of power generated by the fuel battery 12, i.e., with increasing amount of supplied hydrogen gas and air, the purge interval t is, as shown in FIG. 3, made shorter as the detection value of the current sensor 114 rises, specifically with increasing output of the current sensor 114, more specifically, with increasing current generated by the fuel battery 12 (i.e., increasing load on the fuel battery 12). As purges are therefore conducted at optimum timing for the operating state of (load on) the fuel battery 12, it becomes possible to prevent both accumulation of nonreactant gas and/or generated water and repeated execution of unnecessary purges.

When the load on the fuel battery 12 rises sharply, the amount of generated water and/or nonreactant gas that occurs may increase in a short period of time to cause a decline in generated power before the next purge is conducted. Therefore, as shown in FIG. 2, a supplementary purge is conducted even within the purge interval t whenever the detection value of the voltage sensor 116 (output voltage V) falls below a threshold value #V.

As pointed out earlier, however, in the case where purges are conducted in response to a drop in the output voltage V, there is a risk of repeated unnecessary purges being conducted when the fuel battery 12 is connected to a high-load external piece of equipment and the output voltage is stable at a low level.

In this embodiment, therefore, the threshold value #V below which purge is conducted is, as shown in FIG. 3, defined as a function of the detection value of the current sensor 114. Specifically, the value of the threshold value #V is made smaller as the detection value of the current sensor 114 becomes larger, i.e., as the load on the fuel battery 12 becomes larger. This makes it possible to deal with cases in which the amount of nonreactant gas and/or generated water produced increases within a short time period and also to avoid unnecessary purges in cases where a decrease in output voltage occurs even when the fuel battery 12 is connected to a high-load external piece of equipment.

When a purge is conducted, it is desirable for all nonreactant gas and generated water present in the fuel battery 12 to be completely discharged. This can be achieved by making the time period per purge (called "purge time") sufficiently long. However, setting the purge time too long may result in discharge of unreacted hydrogen gas to the exterior.

In this embodiment, therefore, as shown in FIG. 2, purge is terminated when the hydrogen sensor 86 detects flow of hydrogen gas into the purged gas discharge passage 82 (when the hydrogen sensor 86 outputs an ON signal). Specifically, this embodiment is configured to respond to an ON signal from the hydrogen sensor 86 by closing the fourth solenoid valve 84 installed in the purged gas discharge passage 82 downstream of the hydrogen sensor 86, thereby stopping the outflow of hydrogen gas, and simultaneously closing the third solenoid valve 60 installed in the fifth passage 54, thereby shutting off the supply of nitrogen gas, and opening the first solenoid valve 44 and second solenoid valve 46 installed in the second passage 34b, thereby starting the supply of hydrogen gas. By this configuration, it is possible to discharge completely the nonreactant gas and generated water retained in the fuel battery 12 irrespective of the amounts present and also to prevent discharge of unreacted hydrogen to the outside.

Thus, the first embodiment is configured to have a fuel-cell system 10 having a fuel battery 12 comprising more than one fuel cell 14 that changes chemical energy of a fuel and oxidant to electric energy, comprising: a first passage (fifth passage 54) connecting the fuel battery to a purge gas supply source (nitrogen gas cylinder 52); a second passage (purged gas discharge passage 82) connecting the fuel battery to exterior of the fuel battery; a first solenoid valve (third solenoid valve 60) installed in the first passage; a second solenoid valve (fourth solenoid valve 84) installed in the second passage; a current sensor 114 producing an output indicative of current I generated by the fuel battery; and an electronic control unit (ECU 110) that opens the first and second solenoid valves to open the first and second passages to supply the purge gas to the fuel battery through the first passage such that residue in the fuel battery is purged to the exterior through the second passage by the purge gas, at a time interval (purge interval t) determined from the output of the current sensor. In the system, the time interval (purge interval t) is determined to be shorter with increasing output of the current sensor.

With this, it is possible to conduct purges at optimum timing for the operating state of (load on) of the fuel battery 12 and also to prevent repetition of unnecessary purges. Moreover, the purge time (time period per purge) is conventionally of fixed length, so that the purges are liable either to be too short for the amount of retained nonreactant gas and/or generated water, in which case the nonreactant gas and generated water are not completely discharged, or to be too long, in which case unreacted hydrogen gas is discharged to the exterior. However, the system according to this embodiment can completely discharge nonreactant gas and generated water retained in the fuel battery regardless of the amount thereof and prevents discharge of unreacted hydrogen.

The system further includes: a hydrogen sensor 86 installed in the second passage and producing an output indicating that hydrogen gas flows into the second passage; and the electronic control unit terminates purging of the residue when it is detected that the hydrogen gas flows into the second passage from the output of the hydrogen sensor. With this, it is possible to discharge completely the nonreactant gas and generated water retained in the fuel battery irrespective of the amounts present and also to prevent discharge of unreacted hydrogen to the outside.

The system further includes: a voltage sensor 116 producing an output indicative of voltage V generated by the fuel battery; and the electronic control unit opens the first and second solenoid valves to open the first and second passages to purge the residue to the exterior when the voltage detected from the output of the voltage sensor falls below a threshold value #V. As a result, it is possible to deal with cases in which the amount of nonreactant gas and/or generated water produced increases within a short time period and also to avoid unnecessary purges in cases where a decrease in output voltage occurs even when the fuel battery 12 is connected to a high-load external piece of equipment. The threshold value #V is determined from the current detected from the output of the current sensor 114. Specifically, the threshold value #V is determined to be shorter with increasing output of the current sensor 114.

A fuel-cell system according to a second embodiment of this invention will now be explained with reference to FIGS. 4 and 5.

Figure 4:
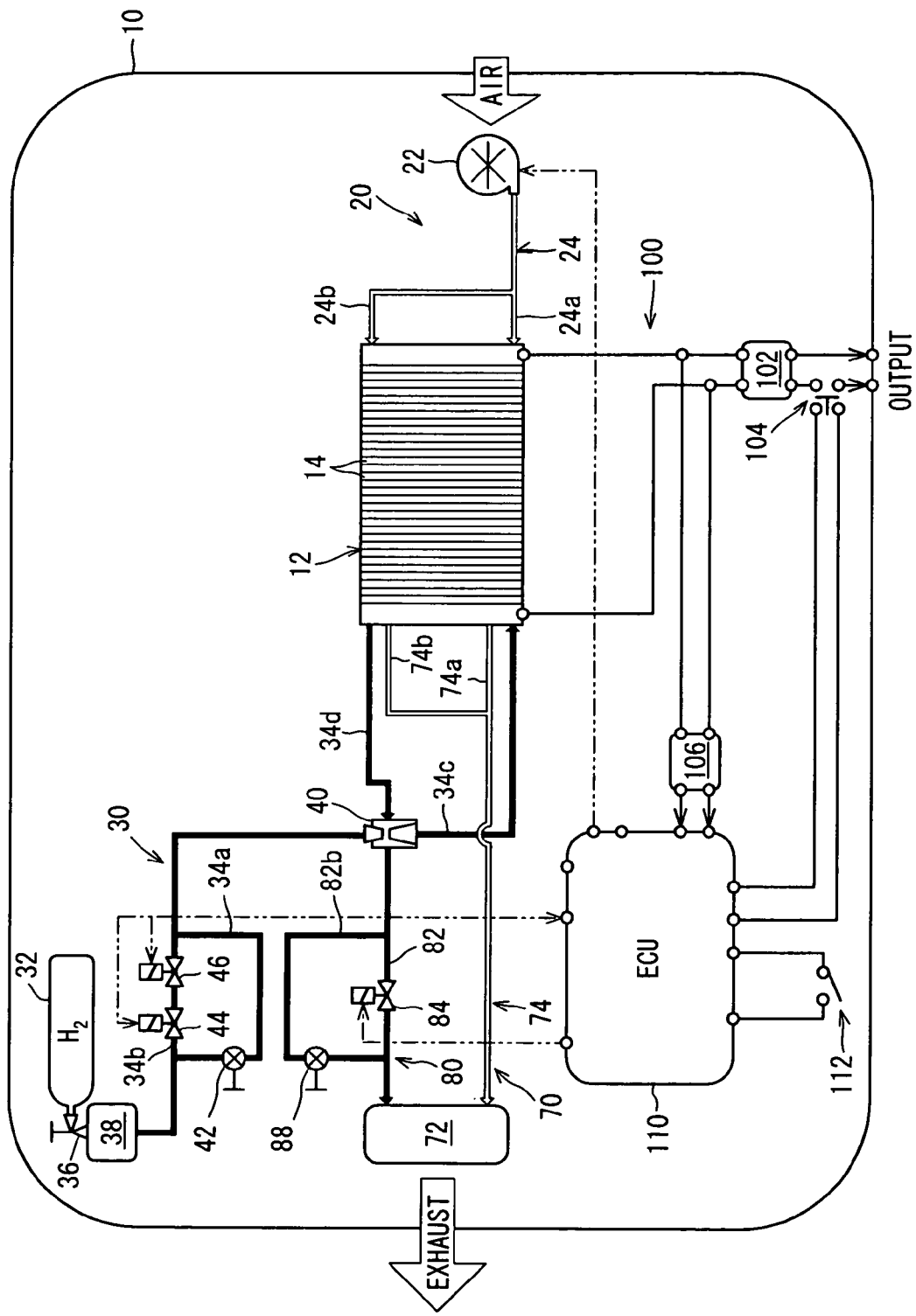
FIG. 4 is a view, similar to FIG. 1, but showing the configuration of a fuel-cell system according to a second embodiment of this invention.

FIG. 4 is a view, similar to FIG. 1, but showing the configuration of a fuel-cell system according to the second embodiment of this invention.

The explanation of the second embodiment will focus on the points of difference from the first embodiment. In the second embodiment, the system configuration is simplified by eliminating the nitrogen gas supply system. The purge gas discharge system 80 has a second purged gas discharge passage (residue discharge passage) 82b that bypasses the forth solenoid valve 84 and a second manual (manually operated) valve 88 is installed in the second purged gas discharge passage 82b.

The second embodiment aims to achieve the aforesaid second object. Specifically, as discussed above, when the operation of a fuel-cell system is terminated, nitrogen and other nonreactant gases may be retained in the fuel electrode owing to air flowing in from the air electrode through the electrolytic membrane. In addition, generated water produced in the course of operation sometimes collects to cause water clogging of the passages and diffusion membranes. When such a situation arises, fuel (hydrogen gas) supplied to start power-generation is blocked by the retained gas and/or water and does not reach the fuel electrode, occasionally making it impossible to obtain a desired electromotive force. Although it is known to install a solenoid valve to use an external power source such as a battery, portability is degraded by the larger volume and weight of the unit, when the fuel-cell system can be used as a portable power generating unit.

In view of the above, the fuel-cell system according to the second embodiment is configured to enable fuel supply and discharge or purge of residue at starting of power generation without using an external power source, thereby ensuring to obtain a desired electromotive force.

The operation of the fuel-cell system according to the second embodiment will be explained. FIG. 5 is a flow chart showing this.

Figure 5:
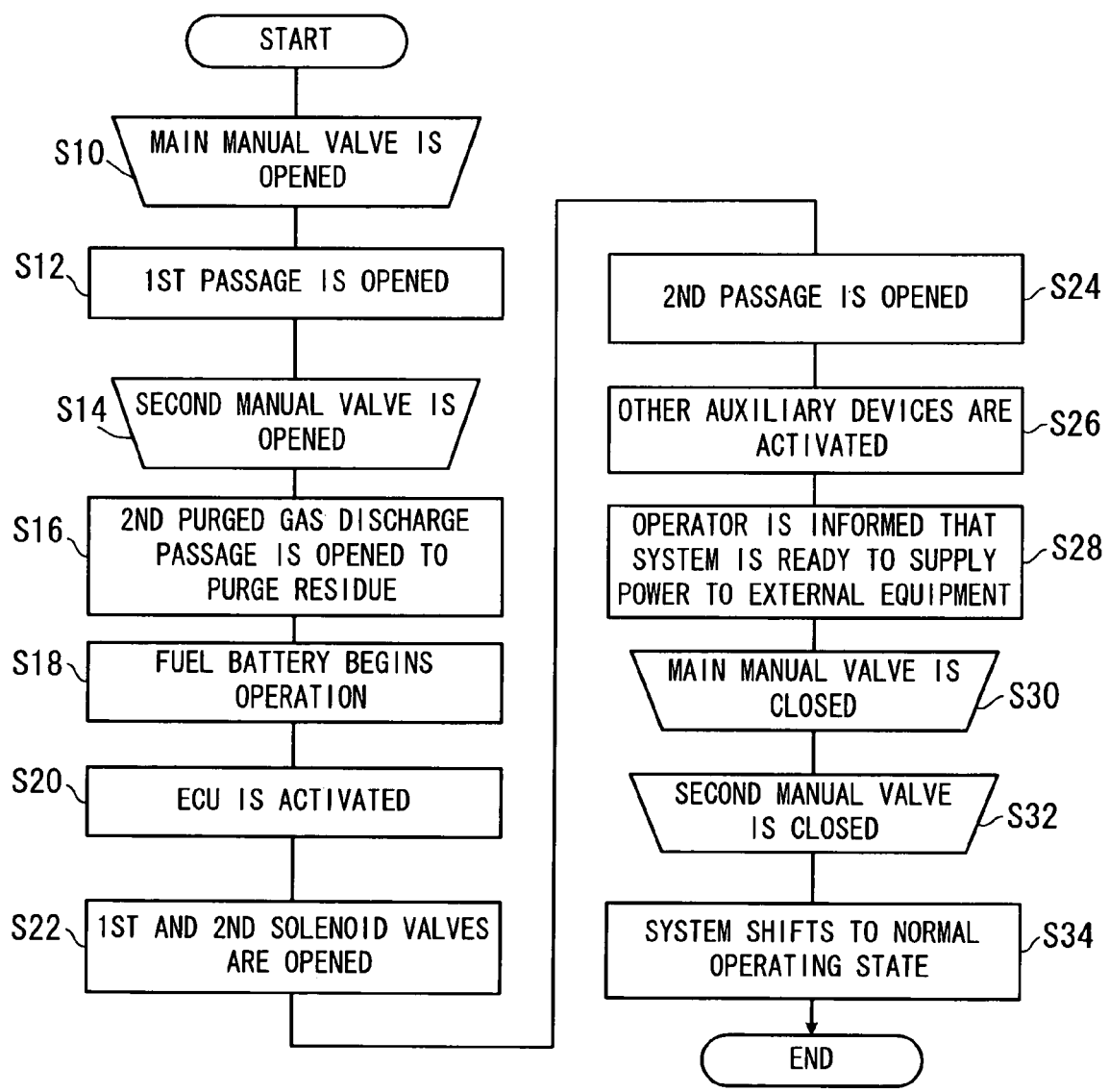
FIG. 5 is a flow chart showing the operation of the system illustrated in FIG. 4.

First, as shown in FIG. 5, the main manual valve 42 is opened by the operator (S10). With this, the first passage 34a is opened to begin supply of hydrogen gas to the fuel battery 12. (S12). Next, the second manual valve 88 is opened by the operator (S14). When the second manual valve 88 is opened, the second purged gas discharge passage 82b is opened so as to discharge (purge) residue (nonreactant gas and/or generated water) to the outside (S16). The hydrogen gas supplied to the fuel battery 12 can thoroughly permeate the fuel electrodes, thereby starting operation of the fuel battery 12 (power generation; S18).

Once the fuel battery 12 begins to generate power, the ECU 110 is activated by the generated power supplied thereto (S20). The ECU 110 opens the first solenoid valve 44 and second solenoid valve 46 (S22) to open the second passage 34b (S24) and activates the other auxiliary devices (S26).

The operations of S12 to S24 will be explained with reference to FIG. 4. The opening of the second manual valve 88 to open the second purged gas discharge passage 82b causes hydrogen gas to be supplied to the fuel electrodes of the fuel battery 12, thereby driving residue retained in the fuel electrodes out of the fuel battery 12 and discharging it to the outside through the fourth passage 34d, ejector 40, second purged gas discharge passage 82b and exhaust manifold 72.

In each cell 14 of the fuel battery 12, the discharge of the residue enables the hydrogen gas to spread throughout the fuel electrode, so that the hydrogen gas supplied to the fuel electrode electrochemically reacts with oxygen or oxidant present at the air electrode to initiate power generation. The portion of the hydrogen gas supplied to the fuel electrode not consumed by the electrochemical reaction with air, is returned to the ejector 40 through the fourth passage 34d and again supplied to the fuel electrodes through the third passage 34c. Once the fuel battery 12 begins to generate power, the generated power is converted to an appropriate DC voltage by the second DC-DC converter 106 and then supplied to the ECU 110 as operating power.

Upon being activated by this supply of power, the ECU 110 opens the first solenoid valve 44 and second solenoid valve 46 to supply hydrogen gas to the fuel electrodes through the second passage 34b. Since activation of the ECU 110 thus causes hydrogen gas to be supplied through the second passage 34b, the cross-sectional area of the second passage 34b is set so as to adjust the amount (flow rate) of hydrogen gas supplied therethrough to the minimum required for producing the power needed to operate the ECU 110 and the solenoid valves.

Like the first embodiment, the ECU 110 also operates the auxiliary devices other than the solenoid valves. Specifically, it operates the air blower 22 to blow air into the air supply line 24. The air blown into the air supply line 24 by the air blower 22 is divided between the cooling air supply passage 24a and reactant air supply passage 24b at a predetermined ratio. The air passing into the cooling air supply passage 24a is supplied to the individual cells 14 as cooling air and the air passing into the reactant air supply passage 24b is supplied to the individual air electrodes as reactant air. The cooling air used to cool the individual cells 14 and the reactant air having passed through the air electrodes are passed out of the fuel battery 12 through the cooling air discharge passage 74a and reactant air discharge passage 74b, respectively, and then discharged to the exterior through the exhaust manifold 72.

The activation of the ECU 110 and resulting opening of the first solenoid valve 44 and second solenoid valve 46 make it unnecessary for the first manual valve 42 to remain open. The ECU 110 therefore informs the operator that power generation by the fuel battery 12 has started and the ECU 110 been activated, i.e., that the fuel-cell system 10 is ready to supply power to an external piece of equipment (S28). After the first manual valve 42 and second manual valve 88 have been closed in response to this announcement (S30, S32), the fuel-cell system 10 shifts to a normal operating state (under control of the ECU 110; S34).

The operations from S28 to S34 will be explained with reference to FIG. 4. The ECU 110 operates the indicator to inform the operator that power generation by the fuel battery 12 has started and the ECU 110 been activated, i.e., that the fuel-cell system 10 is ready to supply power to an external piece of equipment (load). Upon learning that the fuel-cell system 10 is ready to supply power, the operator closes the first manual valve 42 and second manual valve 88 to close the first passage 34a and second purged gas discharge passage 82b and put the fuel battery 12 in a normal operating state.

After the fuel battery 12 has entered the normal operating state, the operator manually operates the operating switch 112 and the ECU 110 operates the relay 104 in the output circuit 100 to supply power to the first DC-DC converter 102 and the external load, whereupon the power generated by the fuel battery 12 and converted to an appropriate DC voltage by the first DC-DC converter 102 is supplied to the external load through the relay 104. During the operation of the fuel battery 12, the ECU 110 periodically operates the first to third solenoid valves 44, 46 and 84 to purge (discharge residue from) the fuel battery 12.

The embodiment of the fuel battery 12 in accordance with this invention is thus configured to comprise the first passage 34a that bypasses the first solenoid valve 44 and second solenoid valve 46 for closing and opening the second passage 34b constituting the fuel supply path, the main manual valve 42 installed in the first passage 34a, the second purged gas discharge passage 82b (constituting the purged residue passage that) bypasses the third solenoid valve 84 for closing and opening the purged gas discharge passage 82, and the second manual valve 66 installed in the sixth passage 62b and, at starting of the fuel-cell system 10, to open the first manual valve 42 to supply hydrogen gas to the fuel battery 12 and open the second manual valve 88 to discharge (purge) residue present in the fuel battery 12. As a result, it is possible to conduct supply of hydrogen gas and discharge of residue at the time of starting the fuel-cell system 10 without use of an external power source.

A fuel-cell system according to a third embodiment of this invention will now be explained with reference to FIG. 6.

Figure 6:
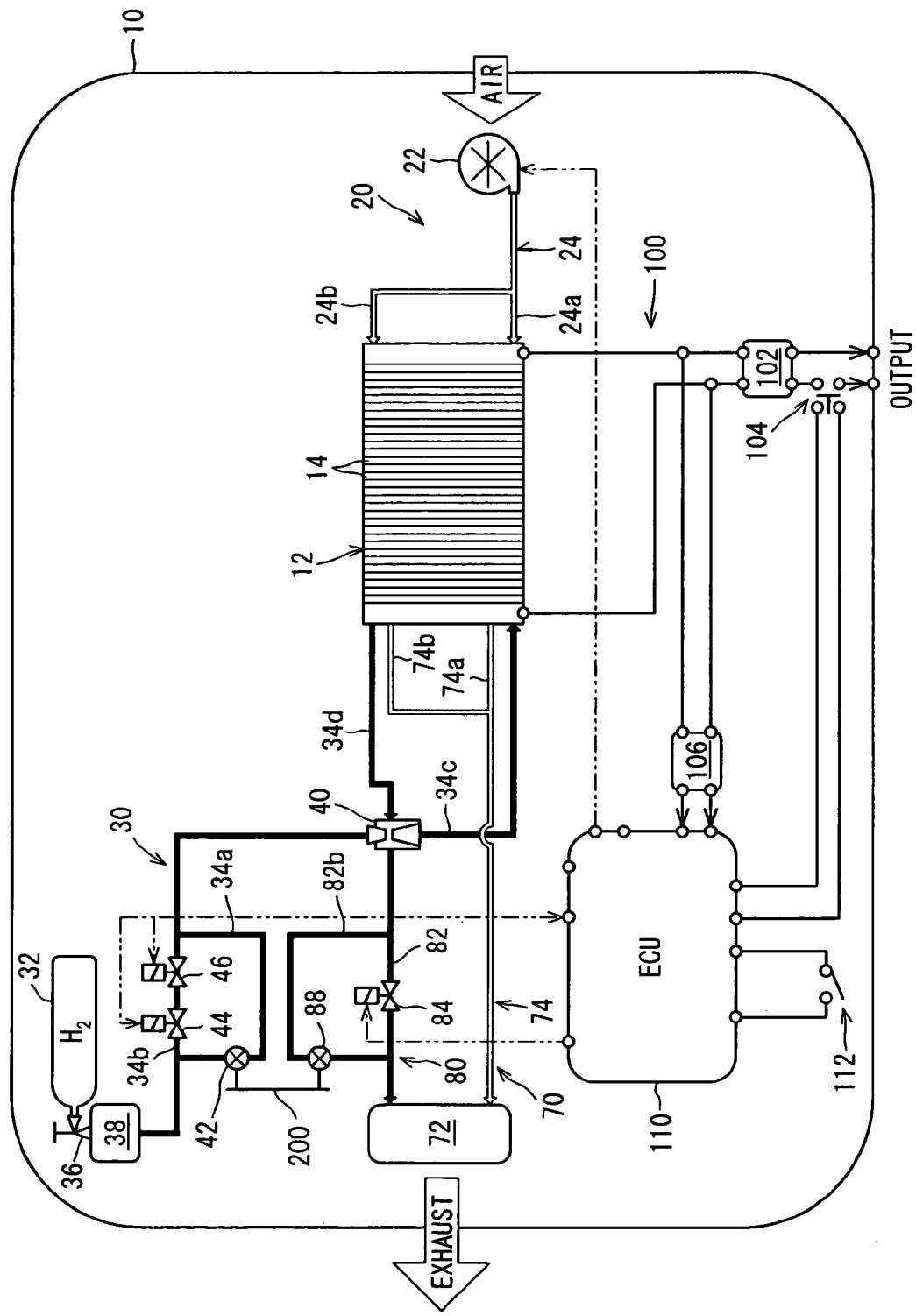
FIG. 6 is a view, similar to FIG. 4, but showing the configuration of a fuel-cell system according to a third embodiment of the invention.

FIG. 6 is a view, similar to FIG. 4, but showing the configuration of a fuel-cell system according to the third embodiment of the invention.

The explanation of the third embodiment will focus on the points of difference from the second embodiment.

In the fuel-cell system according to the third embodiment, the first manual valve 42 and second manual valve 88 are provided with a coupler 200 that couples the first and second manual valves 42 and 88 for enabling ganged operation of these two valves. More specifically, the coupler 200 couples the first and second manual valves 42 and 48 such that they are opened or closed together. Both the first manual valve 42 and the second manual valve 88 can therefore be simultaneously opened and closed by operating the coupler 200. This enables the supply of hydrogen gas and the discharge of residue to be conducted by a single operation. In the flowchart of FIG. 5, this amounts to combining the operations of S10 and S14 and combining the operations of S30 and S32. The result is simplification of startup and prevention of operational errors.

Other configurational aspects of the third embodiment are the same as those of the second embodiment and will not be explained again here.

A fuel-cell system according to a fourth embodiment of this invention will now be explained with reference to FIGS. 7 and 8.

Figure 7:
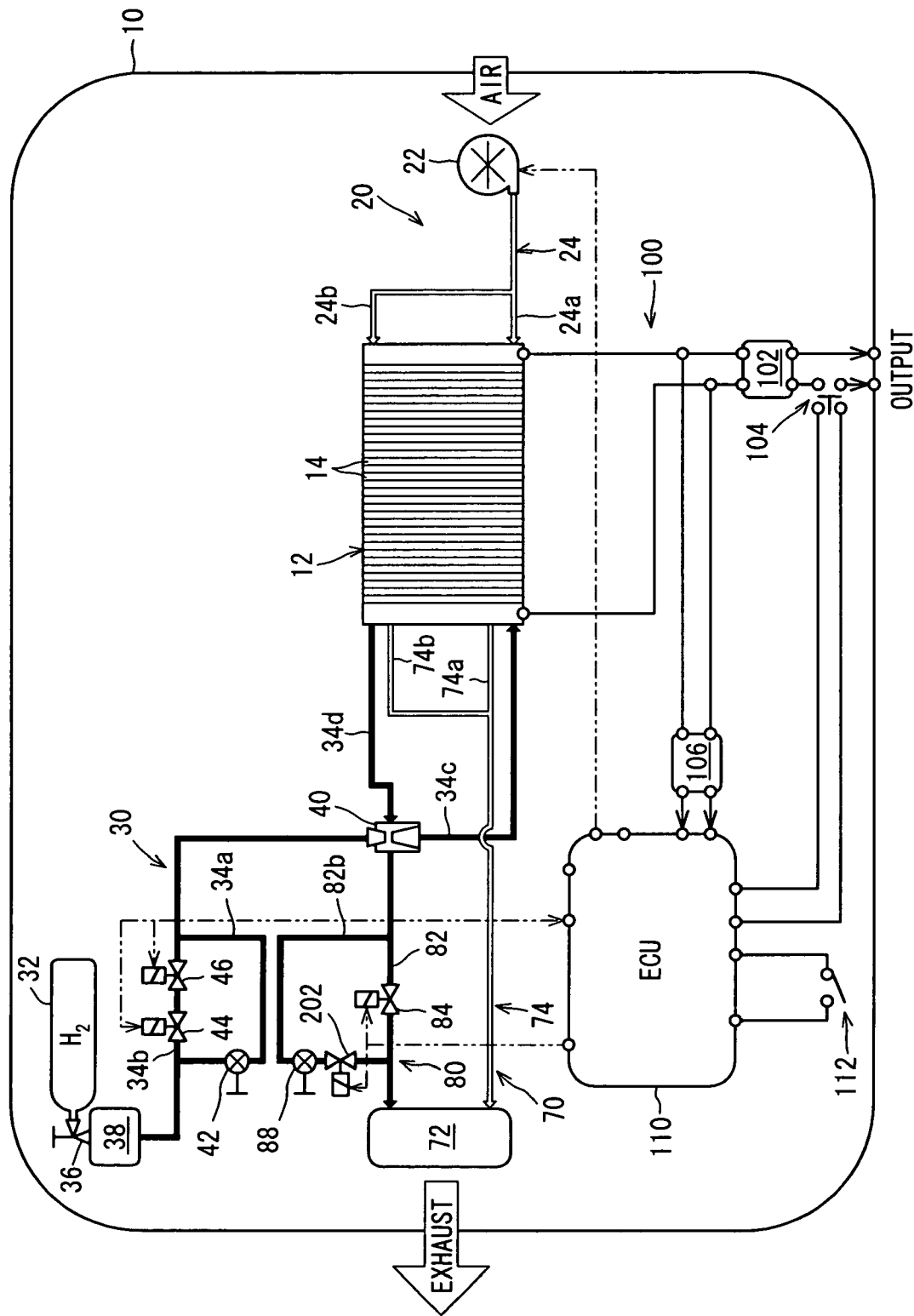
FIG. 7 is a view, similar to FIG. 4, but showing the configuration of a fuel-cell system according to a fourth embodiment of the invention.

FIG. 7 is a view, similar to FIG. 4, but showing the configuration of a fuel-cell system according to the fourth embodiment of the invention.

The explanation of the fourth embodiment will also focus on the points of difference from the second and third embodiments.

In the fuel-cell system according to the fourth embodiment, a fifth solenoid valve 202 is installed in the second purged gas discharge passage 82b at a point downstream of the second manual valve 88 as a bypass shutoff solenoid valve.

The fifth solenoid valve 202 is also a normally open solenoid valve (i.e., a valve that opens when current is shut off and closes when current is applied) that closes synchronously with starting of the fuel battery 12, i.e., with the start of power generation.

Figure 8:
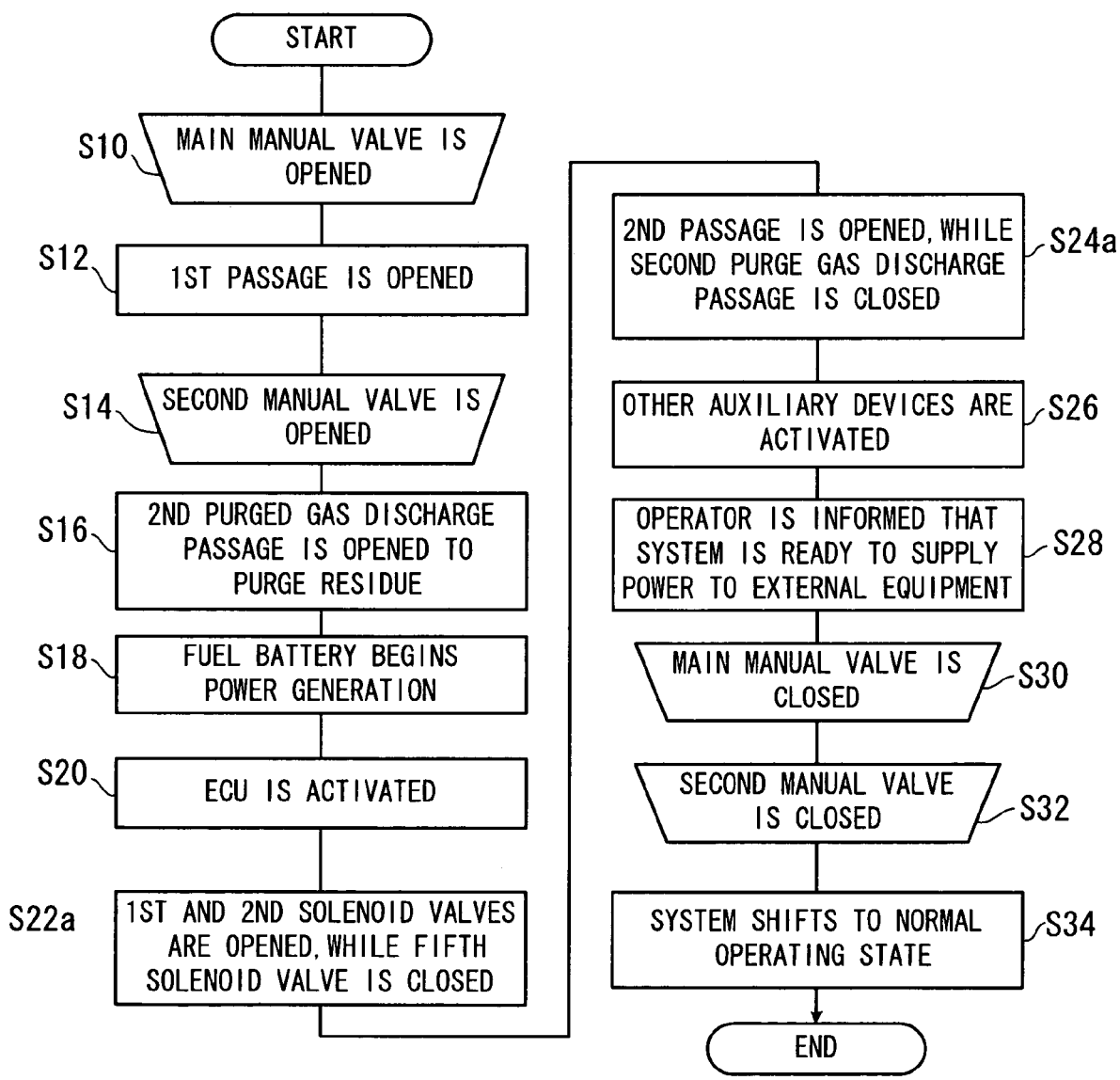
FIG. 8 is a flow chart showing the operation of the system illustrated in FIG. 7.

FIG. 8 is a flowchart similar to that of FIG. 5 showing the sequence of operations when the fuel-cell system according to the fourth embodiment is started. The steps in the flowchart of FIG. 8 that differ from those in the flowchart of FIG. 5 are distinguished by the symbol α suffixed to the step number.

In S22a, following activation of the ECU 110 in S20, the first solenoid valve 44 and second solenoid valve 46 are opened and the fifth solenoid valve 202 is closed. Next, in S24a, the second passage 34b is opened and the second purged gas discharge passage 82b is closed. As a result, no hydrogen gas flows to the exterior after the discharge of residue at startup is completed even if the second manual valve 88 is left open.

Other configurational aspects of the fourth embodiment are the same as those of the second embodiment and will not be explained again here.

A fuel-cell system according to a fifth embodiment of this invention will now be explained with reference to FIG. 9.

Figure 9:
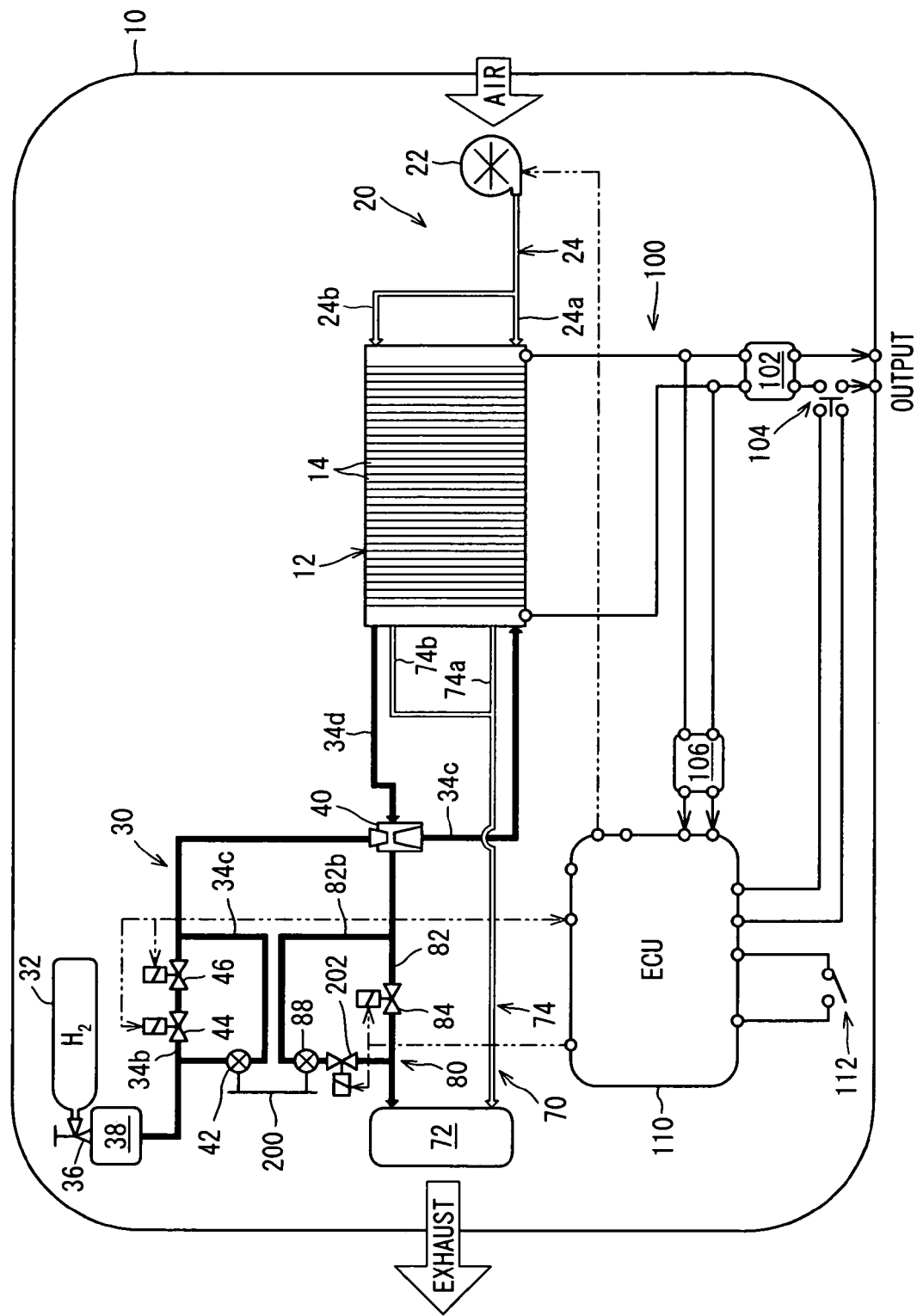
FIG. 9 is a view, similar to FIG. 4, but showing the configuration of a fuel-cell system according to a fifth embodiment of the invention.

FIG. 9 is a view, similar to FIG. 4, but showing the configuration of a fuel-cell system according to the fifth embodiment of the invention.

The explanation will also focus on the points of difference from the foregoing embodiments. In the fuel battery 12 according to the fifth embodiment, the first manual valve 42 and second manual valve 88 are provided with the coupler 200 for enabling ganged operation of these two valves and the fifth solenoid valve 202 is installed in the second purged gas discharge passage 82b at a point downstream of the second manual valve 88.

In other words, the fuel-cell system according to the fifth embodiment incorporates the characterizing features of both the third and fourth embodiments. Therefore, in the sequence of operations for starting the fuel battery 12 shown in the flowchart of FIG. 8, the operations of S10 and S14 are combined and the operations of S30 and S32 are combined.

This configuration of the fifth embodiment simplifies startup and helps to prevent operational errors. In addition, it prevents flow of hydrogen gas to the exterior after the discharge of residue at startup is completed even if the second manual valve 88 is left open.

Other configurational aspects of the fifth embodiment are the same as those of the second embodiment and will not be explained again here.

Thus, the second to fifth embodiments are configured to have a fuel-cell system 10 having a fuel battery 12 comprising more than one fuel cell 14 that changes chemical energy of a fuel and oxidant to electric energy, comprising: a first passage 34a connecting the fuel battery to a fuel gas (hydrogen gas) supply source (hydrogen gas cylinder 32); a second passage (second purged gas discharge passage 82b) connecting the fuel battery to exterior of the fuel battery; a first manual valve (main valve 42) installed in the first passage to be manually opened; and a second manual valve 88 installed in the second passage to be manually opened; the first and second manual valves being arranged to be manually opened by an operator to open the first and second passages to supply the fuel gas to the fuel battery through the first passage such that residue in the fuel battery is purged to the exterior through the second passage by the fuel gas. With this, it is possible to conduct supply of hydrogen gas and discharge of residue at the time of starting the fuel battery 12 (or fuel-cell system 10) without use of an external power source.

The system further includes: a coupler 200 coupling the first and second manual valves such that the first and second manual valves are opened or closed together. With this, the supply of hydrogen gas and the discharge of residue can be conducted by a single operation, thereby simplifying startup and preventing operational errors.

The system further includes: a third passage (second passage 34b) connecting the fuel battery to the fuel gas supply source; and a first solenoid valve (first and second solenoid valves 44, 46) installed in the third passage; and an electronic control unit (ECU 110) that opens the first solenoid valve to open the third passages to supply the fuel gas from the fuel gas supply source; and wherein the first passage 34a bypasses the first solenoid valve (first and second solenoid valves 44, 46).

The system further includes: a second solenoid valve (fifth solenoid valve 202) installed in the second passage; and the electronic control unit closes the second solenoid valve, when it opens the first solenoid valve to open the third passages to supply the fuel gas from the fuel gas supply source. With this, flow of fuel to the exterior is prevented.

Japanese Patent Application Nos. 2003-151990 and 2003-151991 both filed on May 29, 2003, are incorporated herein in its entirety.

While the invention has thus been shown and described with reference to specific embodiments, it should be noted that the invention is in no way limited to the details of the described arrangements changes and modifications may be made without departing from the scope of the appended claims.

What is claimed is:

1. A fuel-cell system having a fuel battery comprising more than one fuel cell that changes chemical energy of a fuel and oxidant to electric energy, comprising:
    a first passage connecting the fuel battery to a purge gas supply source;
    a second passage connecting the fuel battery to an exterior, through an ejector;
    a first solenoid valve installed in the first passage; a second solenoid valve installed in the second passage;
    a current sensor producing an output indicative of current generated by the fuel battery; and
    an electronic control unit that opens the first and second solenoid valves to open the first and second passages to supply the purge gas to the fuel battery through the first passage such that residue in the fuel battery is purged to the exterior through the second passage by the purge gas, at a time interval determined from the output of the current sensor, further including:
    a hydrogen sensor installed in the second passage at a position located downstream of the ejector and producing an output indicating that hydrogen gas flows into the second passage at a position located downstream of the ejector;
    and the electronic control unit terminates purging of the residue when it is detected that the hydrogen gas flows into the second passage at a position located downstream of the ejector from the output of the hydrogen sensor.

2. The fuel-cell system according to claim 1, wherein the time interval is determined to be shorter with increasing output of the current sensor.

3. The fuel-cell system according to claim 1, further including:
    a voltage sensor producing an output indicative of voltage generated by the fuel battery; and
    the electronic control unit opens the first and second solenoid valves to open the first and second passages to purge the residue to the exterior when the voltage detected from the output of the voltage sensor falls below a threshold value.

4. The fuel-cell system according to claim 3, wherein the threshold value is determined from the current detected from the output of the current sensor.

5. The fuel-cell system according to claim 4, wherein the threshold value is determined to be shorter with increasing output of the current sensor.

6. The fuel-cell system according to claim 1, wherein the purge gas is nitrogen gas.

* * * * *